US007930263B2

(12) United States Patent
Jagannathan

(10) Patent No.: US 7,930,263 B2
(45) Date of Patent: Apr. 19, 2011

(54) KNOWLEDGE UTILIZATION

(75) Inventor: Ravi Jagannathan, Redwood City, CA (US)

(73) Assignee: Health Information Flow, Inc., Los Altos Hills, CA (US)

( * ) Notice: Subject to any disclaimer, the term of this patent is extended or adjusted under 35 U.S.C. 154(b) by 1133 days.

(21) Appl. No.: 11/622,716

(22) Filed: Jan. 12, 2007

(65) Prior Publication Data

US 2008/0172440 A1   Jul. 17, 2008

(51) Int. Cl.
*G06F 17/00* (2006.01)
*G06N 5/02* (2006.01)
(52) U.S. Cl. ......................................................... 706/46
(58) Field of Classification Search ..................... 706/46
See application file for complete search history.

(56) References Cited

U.S. PATENT DOCUMENTS

| 6,144,954 | A | * | 11/2000 | Li ..................................... 706/62 |
| 6,311,213 | B2 | | 10/2001 | Dawson et al. |
| 7,308,436 | B2 | * | 12/2007 | Bala et al. ......................... 707/693 |
| 7,356,425 | B2 | * | 4/2008 | Krahnstoever et al. ......... 702/94 |
| 7,359,836 | B2 | * | 4/2008 | Wren et al. ..................... 702/189 |
| 7,428,545 | B2 | * | 9/2008 | Bala ..................................... 1/1 |
| 7,603,330 | B2 | * | 10/2009 | Gupta et al. ..................... 706/20 |
| 7,702,611 | B2 | * | 4/2010 | Chi et al. ................ 707/999.001 |
| 2001/0013059 | A1 | | 8/2001 | Dawson et al. |
| 2002/0065712 | A1 | * | 5/2002 | Kawan ............................. 705/14 |
| 2002/0133491 | A1 | | 9/2002 | Sim et al. |
| 2003/0037061 | A1 | | 2/2003 | Sastri et al. |
| 2003/0120723 | A1 | | 6/2003 | Bright et al. |
| 2003/0126136 | A1 | | 7/2003 | Omoigui |
| 2006/0053382 | A1 | | 3/2006 | Gardner et al. |
| 2006/0074980 | A1 | | 4/2006 | Sarkar |
| 2008/0172440 | A1 | | 7/2008 | Jagannathan |

FOREIGN PATENT DOCUMENTS

| WO | WO02/35359 | 5/2002 |
| WO | WO 2004/049670 | 6/2004 |
| WO | WO 2004/075466 | 9/2004 |
| WO | WO 2004/099989 | 11/2004 |

OTHER PUBLICATIONS

Node Interactivity Self Assessment (NISA) and Data Replication in MANETs, Sadeghi, S.S.; Jabbehdari, S.; Information Management and Engineering, 2009. ICIME '09. International Conference on Digital Object Identifier: 10.1109/ICIME.2009.134 Publication Year: 2009 , pp. 226-230.*
Understanding hand gestures using approximate graph matching, Miners, B.W.; Basir, O.A.; Kamel, M.S.; Systems, Man and Cybernetics, Part A: Systems and Humans, IEEE Transactions on vol. 35 , Issue: 2 Digital Object Identifier: 10.1109/TSMCA.2005.843378 Publication Year: 2005 , pp. 239-248.*

(Continued)

*Primary Examiner* — Michael Holmes
(74) *Attorney, Agent, or Firm* — Fish & Richardson P.C.

(57) ABSTRACT

Data is organized in a knowledge network by defining a set of nodes, each node comprising data describing knowledge and a task pertinent to the knowledge, and defining relationships between the nodes based on the data.

16 Claims, 7 Drawing Sheets

OTHER PUBLICATIONS

Worldwide Patent/Published Applications Keyword Search, pp. 1-19, Apr. 25, 2005.

Worldwide Patent/Published Applications Keyword Search, pp. 1-113, May 4, 2005.

Worldwide Patent/Published Applications Keyword Search, pp. 1-48, May 10, 2005.

Nova Spivack, "Minding the Planet: From Semantic Web to Global Mind", accessed Dec. 15, 2010 from the Internet website: http://novaspivack.typepad.com/nova_spivacks_weblog/2004/06/minding_the_pla.html, blog posted on Jun. 26, 2004, printed on Dec. 15, 2010, 13 pages.

International Search Report and Written Opinion from corresponding PCT application No. PCT/US2008/050845 mailed May 8, 2008, 9 pages.

International Preliminary Report on Patentability from corresponding PCT application No. PCT/2008/050845 mailed Jul. 23, 2009, 6 pages.

Eclipse.org, "Eclipse—an open development platform", accessed on Dec. 15, 2010 from Internet website: http://web.archive.org/web/20070104173827/http://www.eclipse.org/, printed on Dec. 15, 2010, 2 pages.

Bolour, Azad, "Notes on the Eclipse Plug-in Architecture", Bolour Computing, accessed on Dec. 15, 2010 from Internet website: http://www.eclipse.org/articles/Article-Plug-in-architecture/plugin_architecture.com, Jul. 3, 2003, Bolour Computing, printed on Dec. 15, 2010, 28 pages.

* cited by examiner

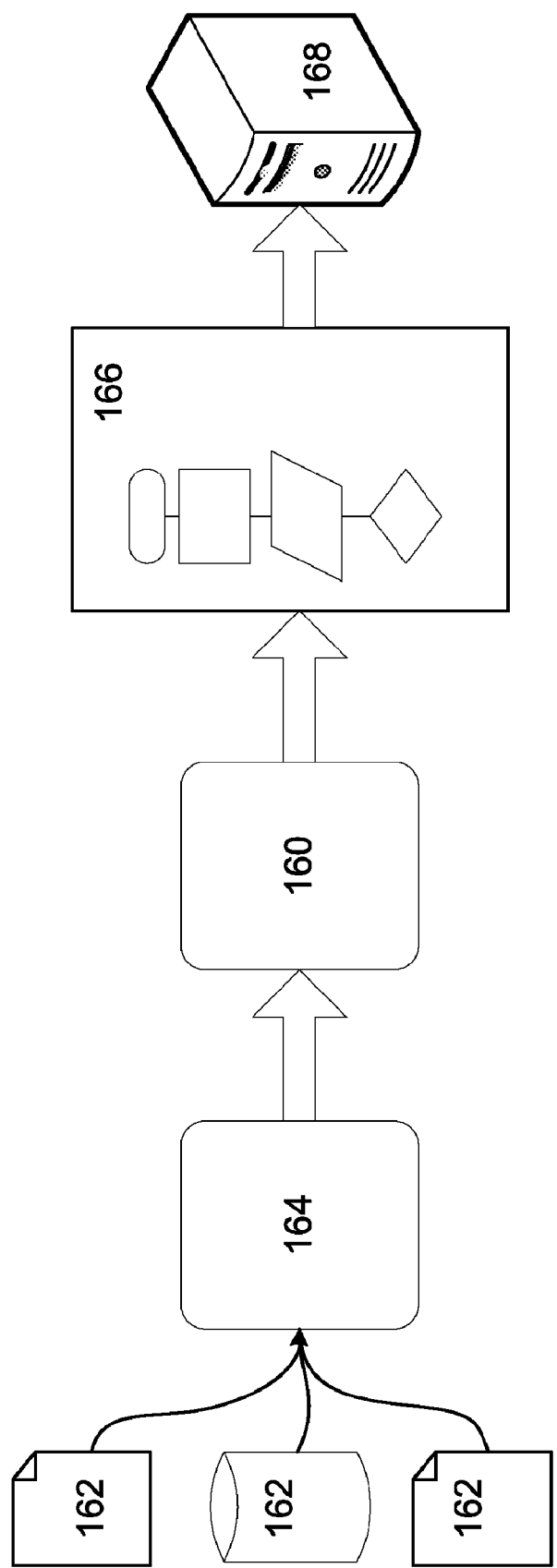

KNOWLEDGE UTILIZATION

BACKGROUND

This description relates to knowledge utilization.

Electronic data organization has begun to move away from hardware-based abstractions (such as flat or hierarchical file systems that are accessed in local area and wide area networks operated by centrally controlled entities or on individual machines) to formulations of knowledge that reflect naturally existing entities in the real world. One wave in that progression has been the World Wide Web (the web). HTML (hypertext markup language) permits flexible exchange of information with an emphasis on the display aspects of information. XML (extensible markup language) provides a document description language, that has been adapted in various representations (governed by different standards) to serve the needs of different application domains.

A body of knowledge that is to shared across multiple domains served by different XML standards is expressed in different shapes or forms in the different domains and must be subjected to complex duplicative and coalescing processing to keep the shared information consistent.

To make the web more useful, The WWW Consortium (W3C) has developed a standard, known as Semantic Web, to help machines to "understand" rather than merely process and distribute data. Semantic Web began as a web-based language that would model data independently of the domain in which it is created or used, enabling new kinds of applications that span multiple domains, such as law enforcement, finance, medicine, technology, or sports.

Virtual networks are sometimes built using layer 2 or 3 of the OSI network model and electronic media for communication. Virtual machines use virtualization of hardware layers to enable more than one operating environment to run at a given time. In databases, information is kept in accordance with a fixed organizational structure, and retrieved using queries built on keys. Web pages are sometimes generated dynamically for a momentary need using scripts or other programs for display purposes.

SUMMARY

In general, in one aspect, a job is enabled to be done using pieces of knowledge that relate to a domain of human activity and that are stored in respective places each under the control of a system that can perform one or more defined tasks with respect to the piece stored there. This is done by defining conceptual nodes, each node identifying at least one of the pieces of knowledge and at least one of the tasks that can be performed using the piece of knowledge. The pieces and the tasks are defined using subsets of a common vocabulary associated with the domain of human activity, and the job to be done is expressed in the common vocabulary and without specifying the location of the pieces of knowledge needed to perform the job or the tasks to be performed to complete the job. The job to be enabled by causing one or more of the conceptual nodes to perform one or more of the tasks on one or more of the pieces of information, without requiring storage of copies of the pieces of knowledge anywhere other than the places that are under control of the systems.

Implementations may include one or more of the following features.

Defining the conceptual nodes includes creating a first node and recording an identification of the at least one piece of knowledge in the first node and a task that the first node is capable of performing. Creating the first node includes, in the first node, collecting knowledge relevant to the task, establishing an RDF triplet and metadata characterizing the first node, providing a server node with the identification of the knowledge in the first node and the task, and carrying out the task. In a node, resources are released from the node, metadata is established characterizing the final state of the node, and the metadata is returned to another node. Performing a task includes, in a routing node, receiving a request that uses a vocabulary that the routing node does not understand, sending the request to a first node that understands the vocabulary, and sending any metadata needed to satisfy the request to the first node. Defining relationships between the nodes includes, in a routing node, receiving a request that uses a vocabulary that the routing node does not understand, receiving a translation of the request's vocabulary from a first node that understands the vocabulary, adding the request's vocabulary to the routing node's vocabulary, and sending the request and any metadata needed to satisfy the request to a node that includes a task corresponding to the request. Performing a task includes, in a routing node, receiving a request that uses a vocabulary that the routing node understands, and sending the request and any metadata needed to satisfy the request to a node that includes a task corresponding to the request.

Performing a task includes, in a switch node, receiving a request that uses a vocabulary that the switch node does not understand, transmitting the vocabulary to discover a first node that understands the vocabulary, sending the request to the first node, and sending any metadata needed to satisfy the request to the first node. Performing a task includes, in a switch node, receiving a request that uses a vocabulary that the switch node does not understand, transmitting the vocabulary to discover a first node that understands the vocabulary, receiving a translation of the request's vocabulary from the first node, adding the request's vocabulary to the switch node's vocabulary, and sending the request and any metadata needed to satisfy the request to a node that includes a task corresponding to the request. Performing a task includes, in a switch node, receiving a request that uses a vocabulary that the switch node understands and sending the request and any metadata needed to satisfy the request to a first node that includes a task corresponding to the request.

Defining the conceptual nodes includes, in a first node, changing one or more of the pieces of knowledge and one or more of the tasks identified by the first node and communicating the change to a second node. First information is retrieved from a subset of the conceptual nodes, a second subset of the conceptual nodes is identified from the first information, second information is retrieved from the second subset, and the second information is provided to an output process.

The subset of the common vocabulary describing the pieces of knowledge for a conceptual node includes a pool of metadata nouns and verbs describing information. The subset of the common vocabulary describing the tasks for a conceptual node includes a pool of metadata verbs describing actions that the node can perform itself. The subset of the common vocabulary describing the tasks for a conceptual node includes a pool of metadata verbs describing actions that the conceptual node can perform for other conceptual nodes in the set. The piece of information for a first node includes an identification of second nodes with which the first node can exchange data. The pieces of knowledge and tasks identified by a node also describe output of the node.

Other features and advantages will be apparent from the description and from the claims.

DESCRIPTION

FIGS. 1-3, 5-6, and 7A are block diagrams of knowledge networks.

Semantic Web technology can be modified and extended to provide a platform by which machine awareness can be used to address a user's need for knowledge and to assemble a chain of knowledge utilization in an automated fashion.

Here we describe an approach that we call knowledge networks for combining, utilizing, and synthesizing any kind of knowledge that is or can be expressed in a machine understandable form. Knowledge network technology uses definite expressions to characterize information, flows of work, and the relationships of entities, among other things.

Knowledge networks are built using metadata that are independent of the domains in which the data is created, held, or used, and thus are relevant and can be applied to all domains that involve knowledge.

Figure 1:
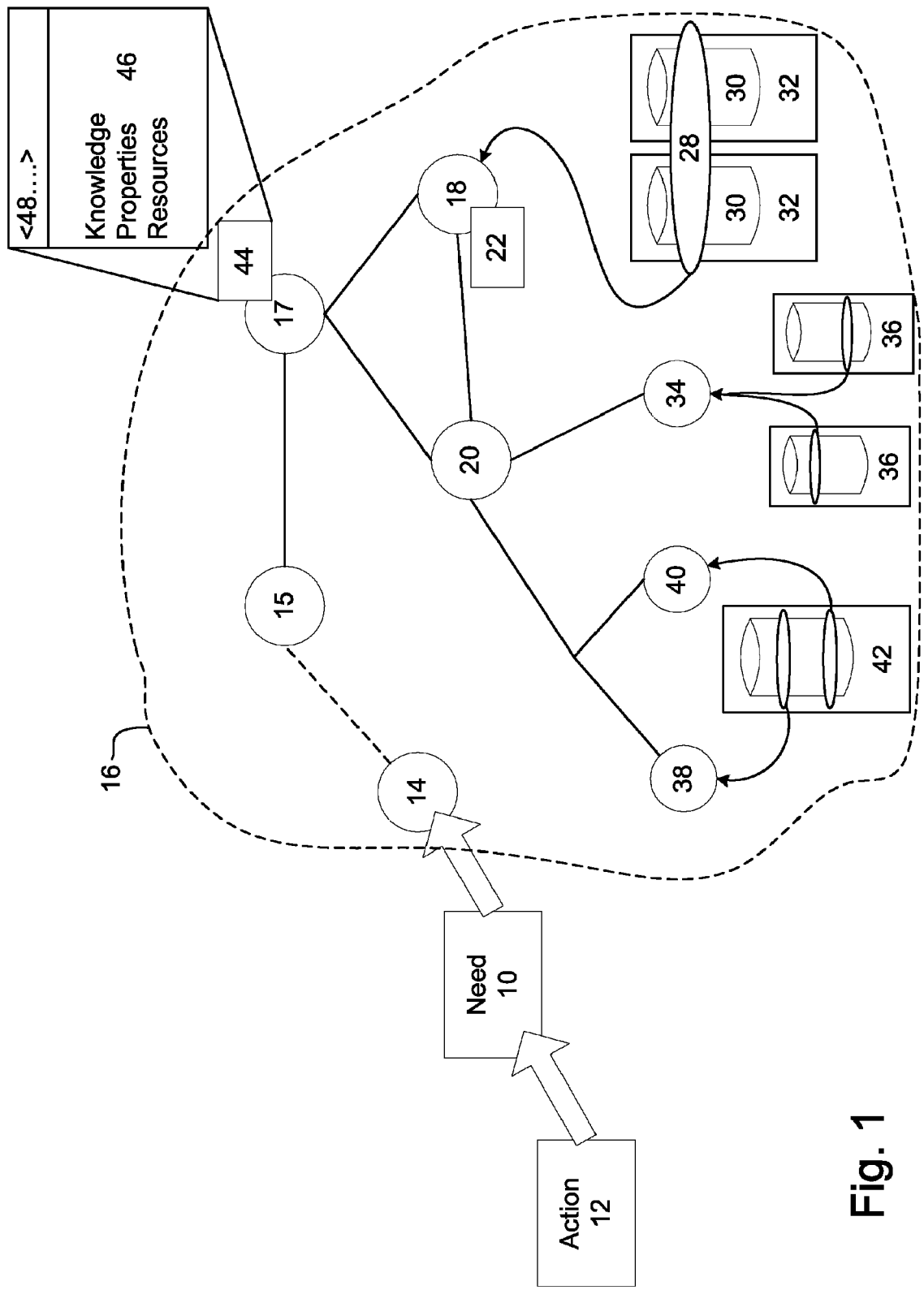

As shown in FIG. 1, in a knowledge network 16, a need for knowledge 10, which is typically prompted by a user's action 12 (which we also sometimes call a knowledge need), such as search, compute, buy, sell, or bid, forms a basis for creation of a node 14 in a knowledge network 16 (which we also sometimes refer to as a knowledge network system). A knowledge network node includes a knowledge engine capable of satisfying an action such as sell, compute, buy, bid, or search. A knowledge network node differs from a file server node or a web server node, or other types of hardware abstraction nodes. For example, there is no hardware address or web address associated with a knowledge network node as there is with nodes at certain levels of typical network models. In some implementations, the knowledge network node would exist entirely at the seventh, or application, layer in the OSI network model, as defined in the ISO standard 7498-1. Other similar approaches could be implemented in other network models. A knowledge network node 18 may be described in terms of existing knowledge 22, which may be knowledge synthesized using existing knowledge, within a knowledge network system 16. Each node in a knowledge network is an engine that works toward satisfying a knowledge need 12. In some examples, when a new node, e.g., node 14, is created, a set of already-existing peer nodes, that is, nodes with similar roles and properties, such as nodes 15 or 17, is identified with which the newly created node 14 can communicate.

A knowledge network is thus a transient entity that is composed, not of physical nodes and physical connections among them, but of intersections 28 of data sets 30 (e.g., knowledge) that exist at one or more physical data sources 32. In the example of FIG. 1, node 18 represents the intersection 28 of data in two data sets 30. Node 15 may be a modification of data in node 17, which in turn is the intersection of nodes 18 and 20. Node 20 represents the intersection of nodes 18, 34, 38, and 40. A data set may self-describe its function or purpose. Each knowledge network node is assembled and disassembled based on the utility of the data sets of that node in serving needs of one or more network users. Because the data sets of a node can remain in their original physical locations, for example, in a server, and under the physical control of the owner of the devices on which they are located, a knowledge network node and a knowledge network that contains such a node (a knowledge network can contain one or more nodes that are created and ended from time to time as needed), provides a powerful conceptual framework for secure and efficient access to information without the need for establishing new physical repositories of sensitive data. This is especially desirable in contexts in which for security or regulatory reasons, it is important not to replicate the data physically in locations other than the original locations.

In some examples of applications of Semantic Web, data identification, modeling, access, and flow are facilitated in a way that differs from XML-based systems in that Semantic Web provides a logical system for building relationships between data located at diverse sources. It is also possible to use XML to build such relationships, which may differ from implementation to implementation. Such implementations would require monitoring for possible fragmentation of the data that might resemble a current state of hard-wired, conventional data storage networks. Such fragmentation may be useful in certain circumstances, and the degree of fragmentation could be customized for a given knowledge network.

The knowledge network may involve data that is available either in a single conventional network node or multiple network nodes, e.g., data sources 32. For example, a single knowledge network node 34 can span many conventional data systems 36, or numerous knowledge network nodes 38, 40 can be based on data located at a single conventional network node 42. As mentioned earlier, physical network systems may be, for example, based on the OSI layers; in contrast, the knowledge network in some examples exists on top of the OSI layers or in a similar position in other network models. Hence, applications and data that belong to lower layers of the OSI model may become building blocks of the knowledge network. Many other network structures are also possible to implement knowledge networks.

In some examples, data utilized in a knowledge network is represented in a data modeling language, comparable to Resource Description Frameworks (RDFs) in Semantic Web and in contrast to the display markup language of HTML or the document markup language of XML. An element 44 in a knowledge network is a piece of semantically consistent metadata. Such an atomic, complete piece of metadata is analogous to a network packet in conventional IP networks, ATM networks, and other similar technologies. For example, elements in XML are identified by paths, while elements 44 in a knowledge network may include knowledge statements, properties, and resources 46 and be represented as URIs 48. A knowledge network can be implemented using any metadata model; RDF in Semantic Web is only one example of such a metadata model. A knowledge network can also be implemented using other appropriate metadata languages. Various knowledge network functions, such as routing, switching, and masquerading, are possible because data in the knowledge network is accessible in a semantic format.

Access to information in a conventional network typically uses a system of addresses of nodes in the network. The addresses are represented by names that are translated into numerical formats before data or applications are placed into network packets that are then sent to nodes located in the network. Networks such as ATM, SONET, Ethernet, or wireless networks, create identities for the nodes that contain names or numbers in a standardized format. For example, in IP4, IDs are formulated in an X.Y.A.B format, where A, B, Y, and X are all numbers in the range of 0 through 255, that is, a well-structured, closed, name space. Networks incorporate the addresses of the source and the destination nodes as part of the packets that travel among these nodes over communication media such as optical fibers, wireless channels, or copper wire.

Figure 2:
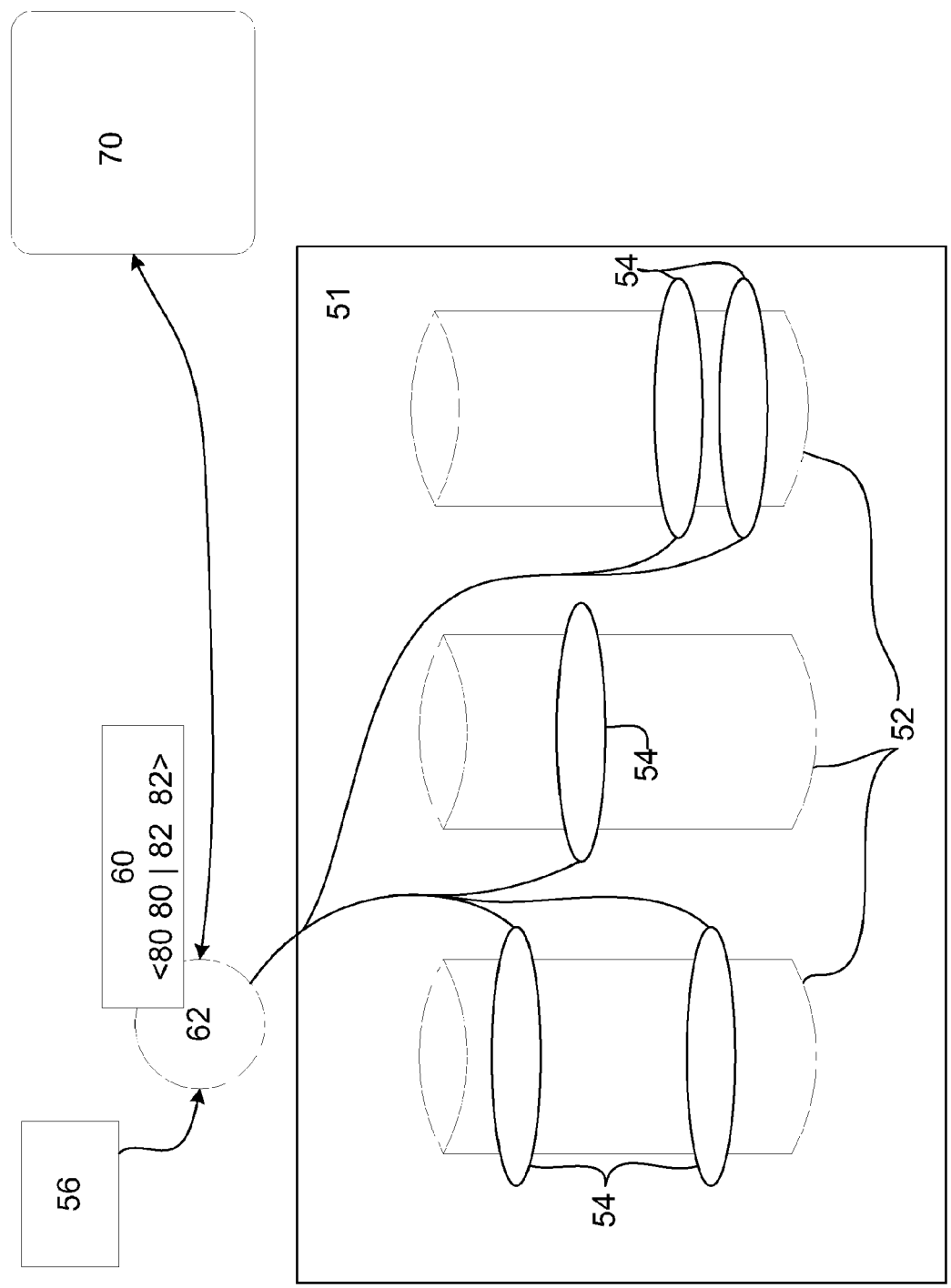

By contrast, as shown in FIG. 2, a knowledge network 50 is not defined by network addresses of physical nodes that host or own data, but by a pool 51 of sets 52 of knowledge 54 pertinent to a question or data 56 under consideration. The name 60 of a node 62 in a knowledge network is not static and need not be assigned by a designated administrator or software such as DHCP (as in the case of an IP network, for example).

In a knowledge network, a node that hasn't fully grown to be in a community of knowledge network nodes is called an unregistered node. This includes a node that is still under construction or a node for which construction is complete but which has not complied with requirements of the knowledge network server or is in the process of complying with such requirements. Such an unregistered node can come into being and simply announce itself, in a limited or unlimited manner, and start living in the network. In order for a node to announce itself, it must have already gone through knowledge server validation. This validation is done by establishing a complete understanding of the node that wants to come into being, by establishing a semantically consistent metadata vocabulary. In other words, in a knowledge network the name space is completely open, and can be comprised of any combination of verbs and nouns (see below) based on the user's need for information or other actions that the user wishes to take with respect to information. A knowledge network server acts as the arbitrator so that no two knowledge network nodes carry the same name in a semantically consistent manner, in the context of the knowledge network under consideration.

What connects an individual knowledge network node 62 to a knowledge network server 70 is a set of well-defined vocabularies that have definite sets of meanings. The name 60 of a knowledge network node 62 is essentially constructed and announced by the node, not imposed by a supervising system. Therefore, the name 60 of a knowledge network node need not follow a strict structure and may be based solely on known and familiar natural language vocabularies. Hence, nodes that pertain to different domains such as medical, law enforcement, financial, or biological fields may come into being using already well-defined sets of vocabularies that are known to users in those domains.

Based on the nature of a query or combination of queries, or on a problem selection and its subsequent information needs, or on the nature of an action to be performed, knowledge network nodes can be created and named using completely different identification (naming) schemes in different domains. For example, a finger print system in a law enforcement domain and an engine that seeks patient information in a medical domain could use entirely different naming schemes. Although the relationship between knowledge network nodes may change, all the nodes within a given knowledge network understand a set of vocabularies that are immutable. Ownership of the data associated with a node may change over time. In some implementations, a node in a knowledge network is identified by one or more nouns 80 and one or more verbs 82 (actions pertinent to these entities) as described below.

When we speak of an identity of a node of a conventional network, we typically would mean an address corresponding to a physical or logical device, but when we speak of an identity of a knowledge network node, we mean a clause of nouns and verbs that describes, in a vocabulary familiar to a domain(s) for which the node is created, what information is in the node and what the node does. A node may span multiple domains, for example, if it concerns interdisciplinary information, and each discipline defines a separate domain.

Many nodes in a knowledge network are transient. They are created to meet a specific need for information and are destroyed when the need is satisfied. For example, when a doctor wants to sell his office, he goes to the knowledge network node and collects or feeds in information relating to the office and tells the node what he wants, i.e., he wants to sell. So, in that context a knowledge network node comes into being (or is created by the knowledge network server). The node is made of data that the doctor provided and any additional data the system put together in a semantically consistent manner. Note that the 'sell' node for the doctor may exist for five minutes or two years, depending on how long it takes to sell. In the meantime, the knowledge network node may mutate in ways aimed at satisfying the need to sell. During the life span of a knowledge network node, it may, given appropriate permission, change its identity through masquerading or by adding or deleting information to or from its identity. When such changes occur, the knowledge network detects the changes and catalogues them. The catalogue 88 of such changes for a node may subsequently be used to revert a knowledge network node to any of its previous states. When a knowledge network node is dissolved, the knowledge network server releases all resources associated with the node and dissolves the node from the server. Note that a node isn't deleted, as there is nothing to delete, the server merely stops binding together the separate pieces of data that constituted the node.

In contrast to the data managed in a traditional network, in which a network ID is assigned to a machine or a virtual server and then associated with the data owned by that machine or the server, the knowledge in a knowledge network is owned not only by a node but also by a natural individual or a legal entity or enterprise. For example, when a knowledge network is deployed in a medical domain, the entity owning knowledge nodes in the network can be a patient, a doctor, an insurance agent, a corporation, a state, a country, or some other entity. In a law enforcement domain, the entity can be a city government, a state government, the federal government, a law enforcement officer, an attorney, or an individual citizen. Ownership of knowledge nodes in the knowledge network can vary based on the time of the ownership and the status of the owner or the data.

Figure 3:
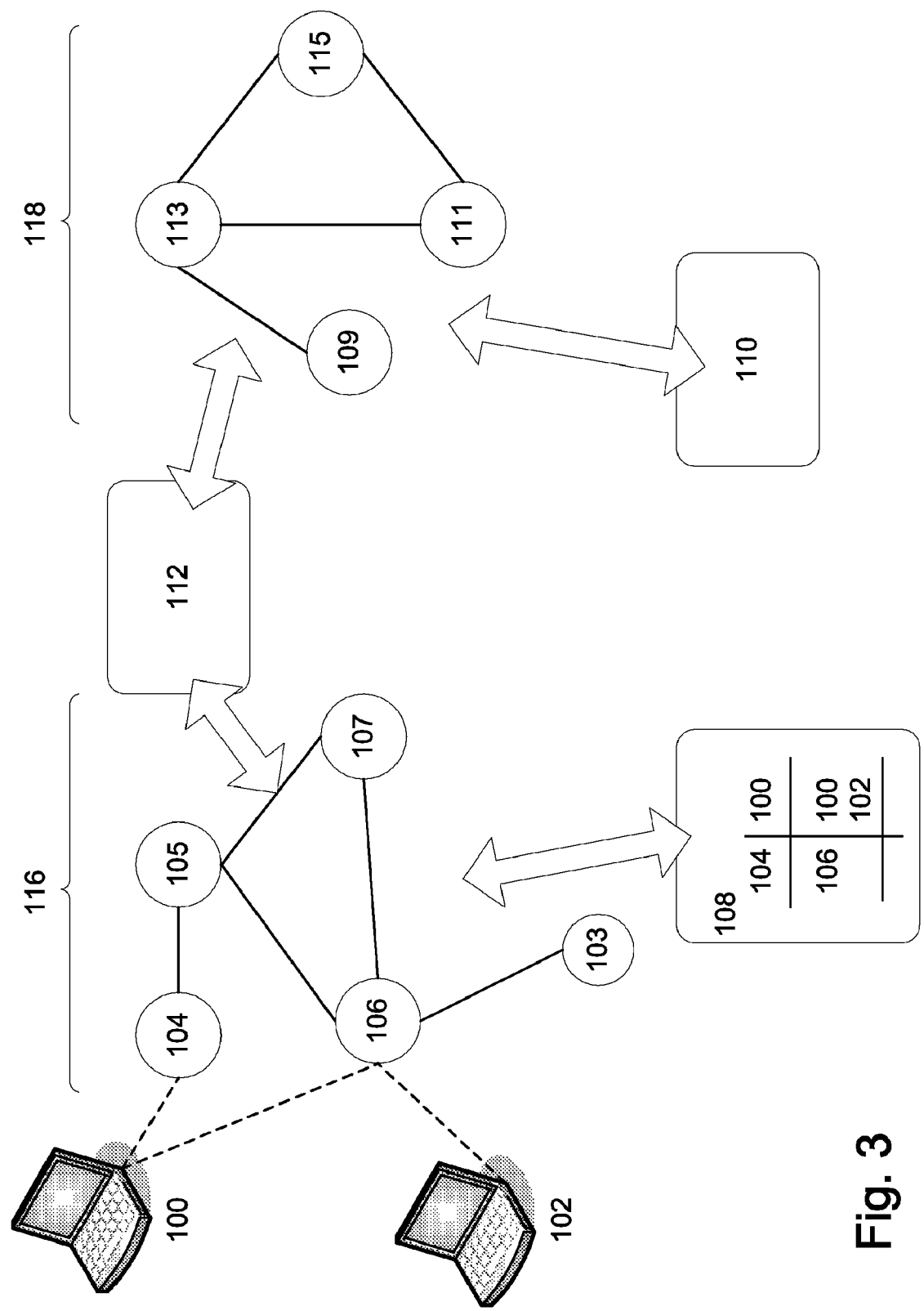

As shown in FIG. 3, a single traditional network node 100, 102 may therefore be related to many knowledge network nodes 104, 106 and vice-versa. A knowledge network yellow pages server 108 may provide a service to map a knowledge network node to corresponding traditional network nodes. This type of reference scheme may be implemented by entities described more generally as knowledge network service nodes, of which the yellow pages server 108 is an example.

Just as domain name servers (DNS) help resolve IP addresses on a conventional network, a knowledge network service node serves transient knowledge network nodes. The life span of a service node may vary depending on its functions and charters. For example, unlike a transient node generated by a specific query, a service node may be created when the knowledge network is created and may exist as long as the knowledge network exists. Service nodes 108, 110 may also be specific to certain domains such as law enforcement 116 (nodes 103-107), patient health record systems 118 (nodes 109, 111, 113, 115), or transportation, or they may be inter-domain nodes, e.g. service node 112, capable of understanding the metadata of multiple domains. Service nodes may be inserted into a knowledge network at any time, whether or not they were conceived or included at the time of the knowledge network's initial implementation.

Nodes can relate to each other through several mechanisms. In some examples, a node can advertise itself, declaring what it can do. A knowledge network server or a set of service nodes may keep a catalog of which node can do what. Other nodes may then ask the server which nodes are available that can perform particular tasks. In some examples, a node may directly contact another node. Nodes know the addresses of other nodes and which nodes are needed to perform a particular task, through the knowledge network server. One example of pseudo code for such a knowledge network server is shown below:

```
Do all initialization;
while (forever) {
    wait for action;
    Based on action, with available knowledge
    (present in the form of metadata),
        Create a knowledge network node; catalogue the
        Details about the node; let the new node run with
        The available knowledge;
        Collect status of dead nodes;
}
Create_knowledge_network_node (action)
{
    Collect all authorized knowledge relevant
    To the action;
    Start the node - meaning construct a web page (in
    one possible implementation) containing RDF triplets/metadata;
        self catalogue the details with the server;
        Start at the beginning of task of the action -
        Which itself may be described in metadata;
}
Collect status of dead nodes(action)
{
    Release the resources;
    Construct a metadata (may be a webpage)
    Describing the status;
    Return to the server;
}
```

Note that any subset of the above pseudo code may be implemented in C, Java, metadata, C++, etc. The knowledge node server could be implemented as metadata itself.

Nouns describe tangible or intangible things. Verbs describe actions that may be performed by nouns. Examples of nouns that may be used to express a knowledge network node include, for example, in the context of a patient records domain, patient, doctor, and procedure. Patient in turn consists of related data that is also nouns and verbs, such as name (noun) and occupation (verb or noun). Procedure could be a verb or a noun. For example, as a noun, it may describe a property of the patient, that is, that he had the procedure. As a verb, it may describe a property of the doctor, that is, he can perform the procedure. We sometimes refer to a noun as possessing the verbs or other nouns that are associated with it. Typically, a knowledge network node possesses certain verbs that are essential for carrying out the node's intended functions and may also seek other nodes that possess other enabling verbs when charged with specific tasks that it cannot complete itself.

For example, a doctor is treating a patient and decides to consult with a law enforcement domain to see what illegal drugs the patient has taken. The law enforcement knowledge network node will bring in a whole new set of vocabularies, which is not available in the medical domain. This may include definitions of crimes, criminal records, and similar information. It may also include new information about nouns that were already in the medical domain. For example, in the medical domain, cocaine may be defined as an anesthetic and possess information about its proper medical use (verb), while in the law enforcement domain the cocaine noun possesses information about what quantity a dealer (noun) must posses (verb) to be charged (verb) with trafficking (action—verb; criminal charge—noun).

Relationships between nodes are links established through metadata. Such metadata can be a noun (e.g., Jack (node, noun) is Jill's (node, noun) cousin (relationship, noun, part of both Jack and Jill nodes), or a verb (e.g., Dr. Jack (node, noun) operated (relationship, verb, part of Dr. Jack and Jill nodes) on Jill's (node, noun) heart (node, noun, part of Jill node)). Such relationships define semantically well-understood meanings and can be established either at the time of a node's creation or at some time later in a node's life span when it needs the abilities, i.e., verbs, or information, i.e., nouns, verbs, and their associations, of another node. In seeking a specialized verb, such as translation of one data format into another, a node may query all the nodes with which it can communicate, or it may get the details from a service node. It chooses the most appropriate node and gives enough information to that node, which can be a service node or another transient node, to perform the required function. In any case, this propagation of information continues until the data reaches the node that can perform the task. If the node is unable to find a knowledge network node that can perform the task, then in one possible implementation, it may map the verb to a 'NO-OP,' i.e., no-operation or a null operation.

Just as routers and switches switch network packets at various conceptual network levels (OSI layers), routers and switches may be used in knowledge networks to switch metadata at a metadata level, namely at the OSI layer 7 or application layer or may also in even lower layers of OSI, if need mandates.

Apart from conventional IP and ATM networks, other virtual networks have been designed to operate at layer 2 (e.g., 802.11Q), layer 3 (e.g., virtual LAN), for example. In a knowledge network the medium is metadata. The network interconnects data at the application layer by the association of meta-information.

In a knowledge network, the information is not bound to a fixed organizational structure although databases may be one type of a source of knowledge in a knowledge network. The organizing principle of information in a knowledge network is a well-defined, agreed-upon set of vocabularies, which are absent from conventional databases. A knowledge network uses data modeling techniques based on these vocabulariess.

In knowledge networks, the knowledge network node may be static or mutating depending on the circumstances. It may express itself in terms of web pages, data bases, binary data or multi-media data. In knowledge networks, a node may enlarge its scope of 'understanding' by coalescing knowledge through service nodes or consulting with nodes of other domains or of the same domain. In a knowledge network, nodes may discover new services and vocabularies that are useful on the fly and may only associate with the ones that are semantically consistent with the known knowledge. To define syntax in a knowledge network, format and meaning of the data are announced by the data itself, lending the advantages of flexibility to the nodes. Semantic web allows all domain-specific metadata to be defined by specific domains. A given domain may have multiple sets of metadata vocabularies. Yet it is natural for the knowledge network to reconcile the sets on the fly because machine understanding is a fundamental building block of knowledge networks.

Media of a Knowledge Network

In hardware networks, the network nodes are connected by one or more tangible media such as copper, fiber, or wireless. Knowledge network nodes are connected by metadata, which provide the basic medium of communication. The Semantic Web RDF is one possible way to represent such metadata. Just as packets or bit streams flow in a conventional network over a medium, in a knowledge network, bit streams flow in the context of metadata. A piece of metadata, while in transmission, is therefore an atomic element in a knowledge network.

Just as a conventional network cannot work without the functioning of the medium, a knowledge network cannot function without understandable metadata flow. For example, a knowledge network node created by a doctor to find all the details of a particular patient may live for a few moments or days or weeks or years. During its lifetime, the node may communicate with the patient's knowledge network node. This communication may include contacting the patient's phone, PDA, computer, GPS devices or other computing devices, and may even include sending faxes or paper mail to the patient. The doctor's node uses metadata it already has access to about the patient, like his phone number, to transmit data to the phone and request whatever information the phone might have that is relevant to the doctor's node's purpose. When the doctor's node communicates with the patient's, it may bring in new understanding of the patient's condition. The new understanding is entirely metadata that has well defined meanings.

Knowledge Network Functions

Various functions such as routing, switching, translating, and reflecting are defined and executed using data modeling basics similar to those of Semantic Web (e.g., RDF). Like the data and control packets in a traditional network, the metadata defining nodes in knowledge network may also be routed, switched, and translated. A node in knowledge networks is somewhat analogous to a website, though not a perfect analog. Any piece of metadata that has well-defined meaning and is machine-understandable, expressed in full and conforming to known semantics, is equivalent to a transmitted network packet.

In conventional networks, data sent from one program to another over the network may span one or many network packets. Similarly, in a knowledge network communication between two nodes may involve a single piece of metadata or many. In a knowledge network, a node may create a clone of itself and modify this clone to facilitate communication with other knowledge network nodes. In some instances, the node may not create a clone, but may modify itself, thereby changing its identity for all or some portion of its life span. This has some similarity to a mobile agent, that is, an executable entity that can 'move' in a physical or logical sense from one computer to another. Knowledge network nodes may be implemented conceptually as mobile agents. However, they are different in that conventional mobile agents do not necessarily work with a flexible machine-understandable metadata mechanism, but through the conventional programming/web paradigm.

A knowledge network node may contain data that are either modifiable, read-only, or private. The knowledge network may perform functions by changing the logical relationships of various data or by modifying the information contained in the node. For example, Dr. Jack operates on Jill. After a while, it so happens Jill is a dentist, and is doing some dental work on Dr. Jack. Even though Dr. Jack's knowledge network node relates to Jill's node as doctor and patient, it gets reversed while Jill works on Dr. Jack. One verb, i.e., Jill 'doing dental work' on Dr. Jack changes the relationship. As a result, the accessibility of information and understanding of information in the new context will change.

Routing and Switching

The mechanisms of routing and switching in a knowledge network utilize metadata functions such as synonyms, antonyms, etc. The relationship of these mechanisms is described using metadata statements that conform to a metadata language such as XML and Semantic Web.

Conventional networking switches switch a networking packet from one subnet to another. Typically, a networking switch also translates the network addresses, depending on the need. In a knowledge network, a router or switch also does two things: it searches for and finds a required metadata vocabulary, and it translates the data from one vocabulary to another vocabulary.

An example implementation in pseudo-code for a switch is as follows, but other implementations are also possible:

```
While forever {
    Do
        If (no requests pending)
            Continue looping;
        If (the request is valid) {
            If (do not understand the vocabulary) {
                Search which KN node understands the vocabulary
                    by sending same vocabulary from the packet;
                Send the request to the KN node that can
                    translate the vocabulary into what we can
                    understand or augment the vocabulary expanding
                    our innate understanding of vocabulary;
                Route any other metadata that are needed to
    satisfy the request;
            } else {
                Route any other metadata that are needed to
    satisfy the request;
            }
        } else {
            Return error;
        }
}
```

Figure 4:
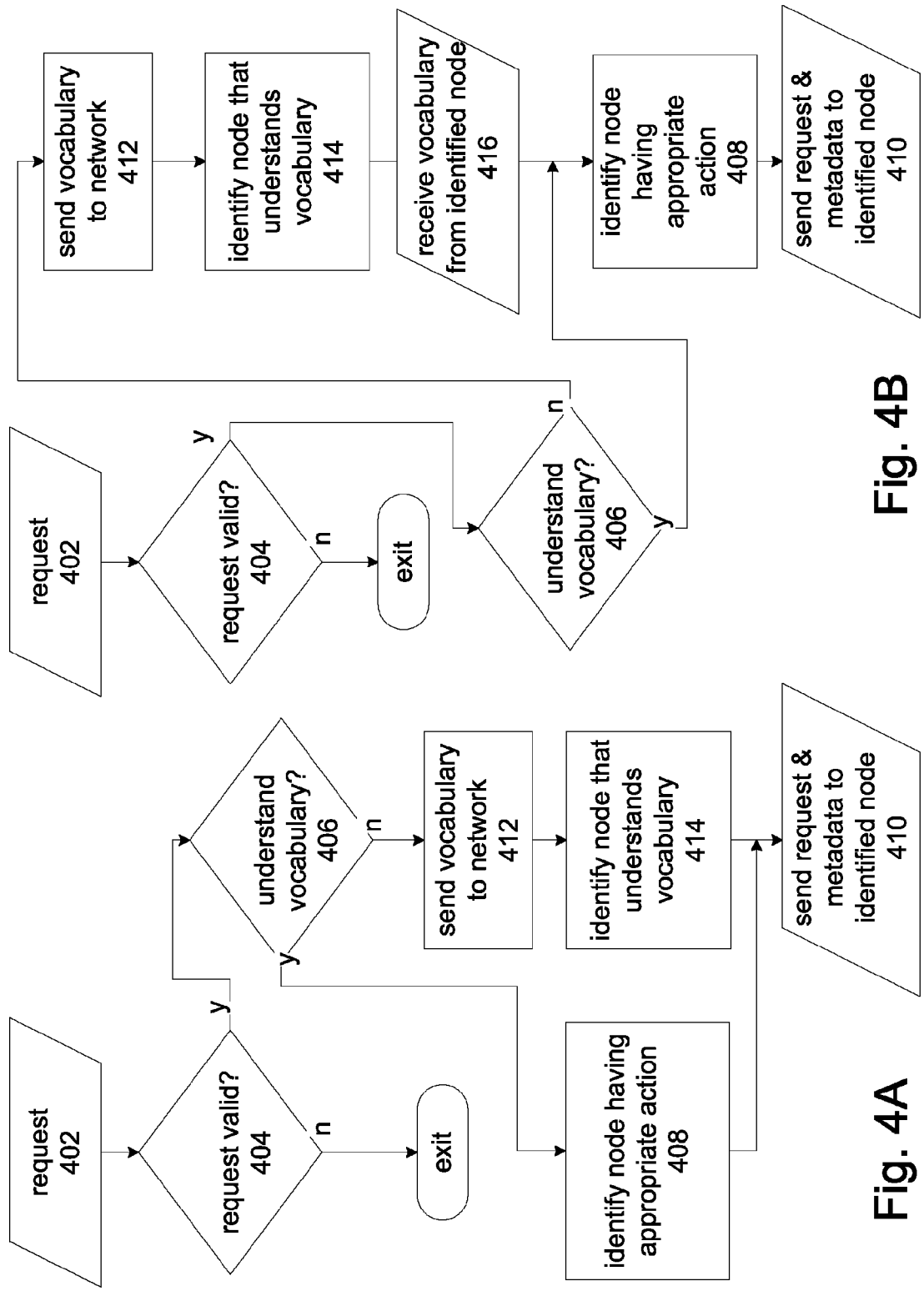
FIGS. 4A and 4B are flow charts.

The requests can come in from a URI. The switch makes use of a metadata router. Even though search itself is a separate function, in this example search+translation+coalescing constitutes switching. An example switch process 400 is shown in FIG. 4A. A request 402 is received and evaluated 404 for validity. If it is valid, the switch determines 406 whether it understands the vocabulary of the request 402. If it does, it identifies 408 another node having the appropriate action for satisfying the request and sends 410 the request and any related metadata to the identified node. If the switch does not have the proper vocabulary, it sends 412 the vocabulary of the request 402 onto the knowledge network to identify 414 a node that does understand the vocabulary of the request 402. Once that node is identified 414, the request and metadata are sent to it 410.

The difference between a knowledge network router and a knowledge network switch is that a router doesn't perform any vocabulary translation. A metadata software router does the job of coalescing metadata and at the moment of routing it knows where the vocabularies are located in the knowledge network. Translation of vocabularies doesn't happen in routing, thus routing is search+coalescing, without the translation. An example routing process 420 is shown in FIG. 4B. The process reuses many elements from process 400, but in a modified order. The request 402 is received and evaluated 404 for validity. If it is valid, the router determines 406 whether it understands the vocabulary as did the switch in process 400, and if it does it similarly identifies 408 a node having the appropriate action and sends the request 402 and metadata to that node. If the router does not understand the vocabulary of the request, it sends 412 the vocabulary to the network and identifies 414 a node that does understand it, but instead of sending the request to that node, the router receives 416 the vocabulary itself so that it can identify 408 a node having the needed action.

An example implementation in pseudo-code for routing is as follows, but other implementations are also possible:

```
While forever {
    Do
        If (no requests pending)
            Continue looping;
        If (the request is valid) {
            If (do not understand the vocabulary) {
                Send the request to the KN node that can
                translate the vocabulary into what we can
                understand or augment the vocabulary expanding
                our innate understanding of vocabulary;
                Route any other metadata that are needed to
satisfy the request;
            } else {
                Route any other metadata that are needed to
satisfy the request;
            }
        } else {
            Return error;
        }
}
```

Translation or Masquerading

A knowledge network node may change its own characteristics, in contrast to the modification of data or control packets, which is done by external agents or algorithms in a conventional network. For example, in a medical knowledge network the self-changing of a node is important for retrieval of information regarding a patient whose data may be recorded, intentionally or unintentionally, under different names. During an operation, the knowledge network system can change some aspects of the node either permanently or for a defined period of time, depending upon the need. This could be implemented with the function defined in the following pseudo code:

```
Masquerade (KNnode, what to masquerade & how to
masquerade list...)
{
    Switch (based on how to masquerade ) {
        Case TABLE_TRANSLATION:
            Do simple table-based translation;
        Case ALGORITHMIC_BASED_MASQUERADE:
            Call the corresponding algorithm;
        // many more such cases are possible in
masquerading.
        Default:
            Do nothing; no masquerading;
    }
}
```

Implementation of a Knowledge Network

There are many possible implementations of knowledge networks.

Figure 5:
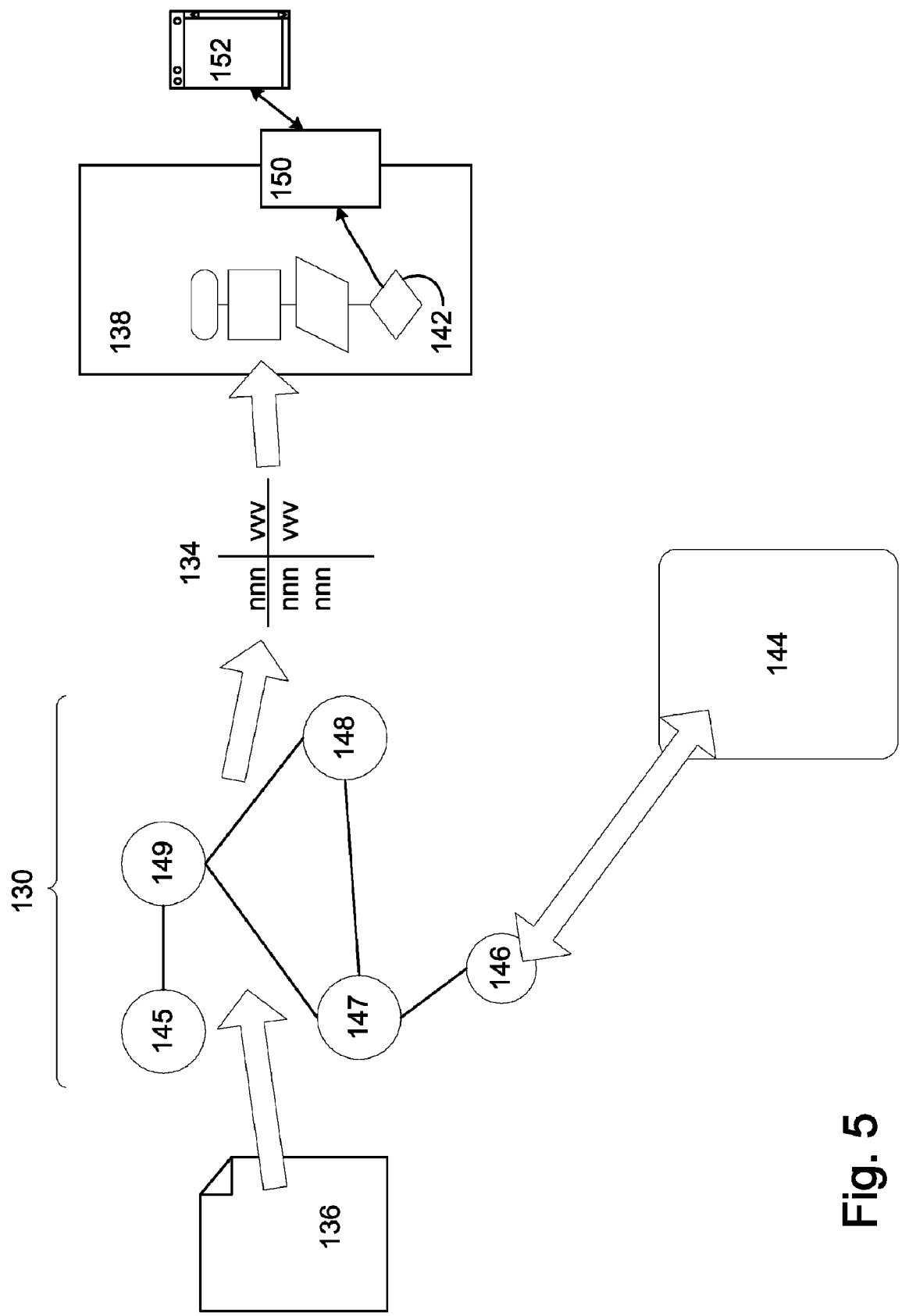

As shown in FIG. 5, in some examples, a knowledge network 130 may operate to automatically generate vocabularies 134 from existing documents 136 and feed the vocabularies into a single pre-built intelligent agent (IA) 138. Such an agent could run on a dedicated operating system. These IAs would tend to be complex, and the collection of such vocabularies would preferably be a continual process. In some implementations, each IA would be associated with a single domain or multiple domains.

An IA can represent a workflow thread 142 that can be implemented as a program (written in metadata, Java, C, C++, or any programming language), or it can represent a workflow that is described in metadata and that can be run either as-is using an interpreter or translated to run directly on hardware. IAs may communicate with a knowledge network server 144 in order to interact with the nodes 145-149 of the knowledge network.

There are many ways IAs can be implemented. The following pseudo code shows one example application. This example IA collects the prescription drugs taken by a patient based on his past history.

```
Get-all-patient-drugs (KNnode of patient)
{
    Get all places the patient lived, worked,
    Visited, and hospitals;
    Get the list of all pharmacies in all
    The places where the patient has been;
    query the pharmacies for the drugs bought by
    the patient;
    return the drug list;
}
```

The above example IA 138 may get the drug list 150 over a period of a week or so. In the meantime, a result page 152 corresponding to the IA 138, which itself is a metadata web page, will continually undergo changes until the IA 138 completes its job and completes the list 150.

In some examples, vocabulary-generating software may work with a set of IAs. The complexity of such software, and therefore the difficulty to maintain the software, would be increased, particularly if targeted for more than one domain.

In some examples, as shown in FIG. 6, a metadata-gathering tool 160 gathers data 162 from text, binary data, databases, or multimedia input. The tool may store the metadata information in binary, text, a database, or multimedia. The metadata gathered by the tool may be used by another tool 164 that produces an IA 166. IAs can run on their own as individual programs.

In some examples, the tool 160 that gathers data and stores the metadata information from and to text, binary, databases, and multimedia can also be an integrated development environment (IDE) for IAs. This tool 160 may help an IA developer output IAs 166 that may run on systems 168, which may run any common operating system, e.g., Windows, Linux, Solaris. The tool may also help an IA developer output IAs that run on application servers to leverage security, reliability and load balancing mechanisms built into application servers.

An Example of a Knowledge Network Implementation: Meeting Modern Needs for More Flexible Data Management In some examples, knowledge networks provide a useful mechanism for exchange and management of patient information for which conventional real-time database queries, identification of diverse patient data locations, data collection from diverse sources with varying or no data structures, analysis and synthesis of this diverse data based on the query posed, and meaningful presentation of the resulting information to the user are all functions that would be useful to perform but are constrained by the diversity of the sources, the disparity or lack of data definitions, and significantly by privacy and security constraints on storage of copies of patient information.

Figure 7B:
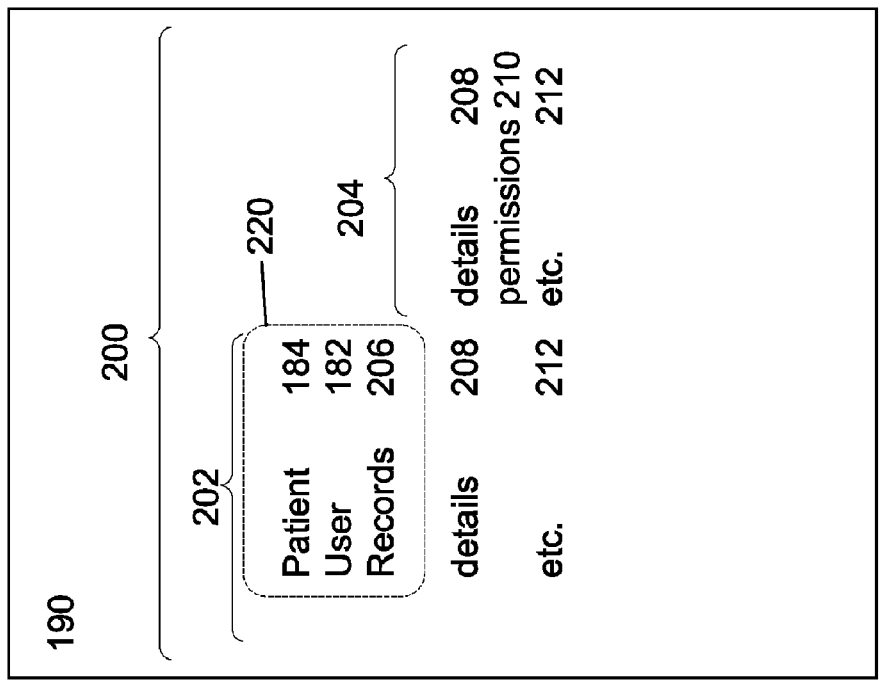
FIG. 7B is a diagram of a node of a knowledge network.
Figure 7A:
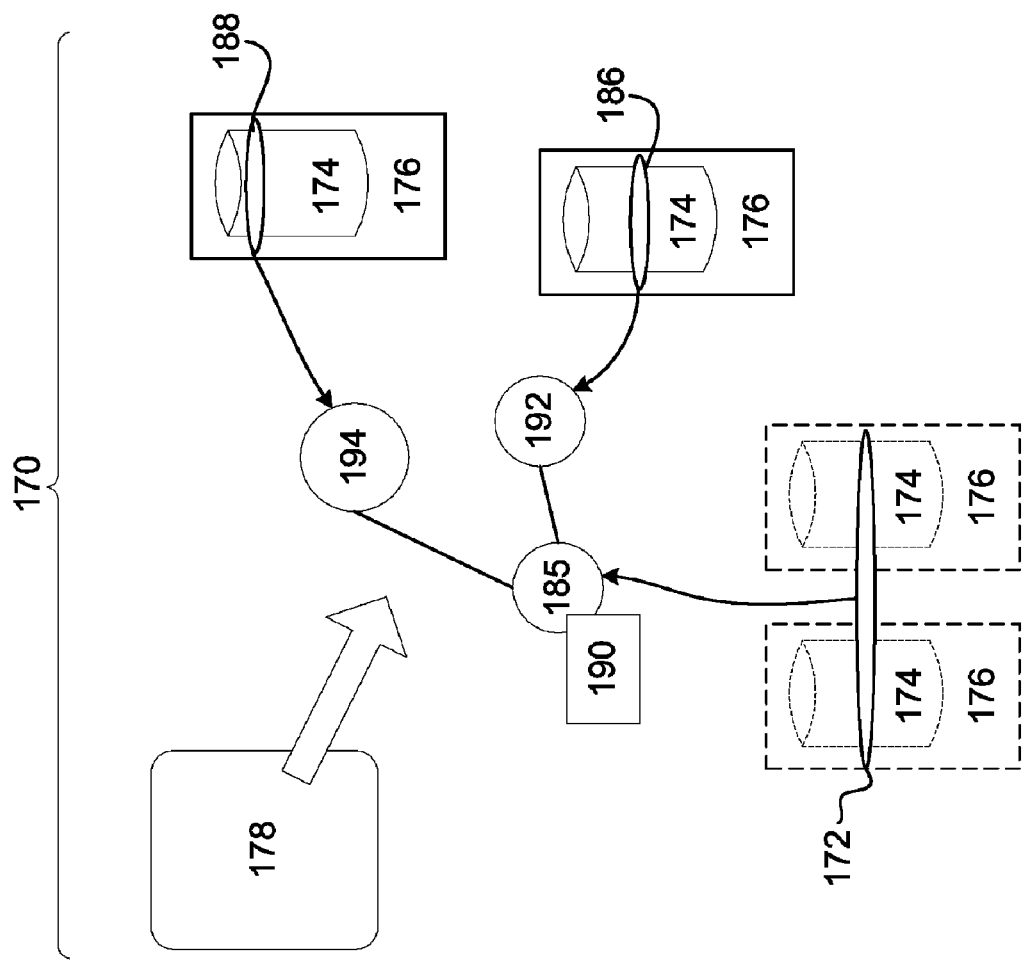

As shown in FIG. 7A, a knowledge network 170 used to address this domain has a structure that is transient and comprised not of physical nodes but of nodes corresponding to intersections 172, 186, 188 of data sets 174 compiled from one or more sources 176. These data sets may self-describe what they can do. These nodes may self-assemble or may be assembled by the knowledge network server 178 and then dissolve based on the utility of the data to network users. This concept of a knowledge network provides a framework for secure and efficient access to information without the need for establishing new repositories of sensitive data, but using the data from where it resides already.

For example, within the medical example featured above, a request 180 is issued by a user 182 to compile a patient's 184 complete medical record from pieces 186, 188 of the record located at and under the control of a variety of computer systems 176. This request is completed without having to fetch the pieces 186, 188 and store copies of them in one place (in violation of security and privacy requirements). The request 180 triggers the knowledge network 170 to create the transient query node 185. The newly created node is characterized by the details 190 (e.g., patient name) given as part of the request by the user 182 who initiated the query. The knowledge network server 178 also catalogues other nodes 192, 194 as they come into existence at the request of the query node 172.

In some examples, medical knowledge network nodes use a metadata scheme to describe themselves to other nodes in the knowledge network. As shown in FIG. 7B, the components of a newly created knowledge network node may include the following. The node details 190 comprise a pool 200 of metadata nouns 202 and verbs 204 that describe the node's 172 identity in terms of the details of the patient 184, the user who initiated the query 182, what kinds of information 206, 188 are requested, known details 208 of the patient, permissions 210 given by the patient to his doctor and to the network 170, and other context-sensitive details 212 related to drugs, treatment protocols. Metadata verbs 204 describe functions that the node can perform for itself or for other nodes in the knowledge network. A description 206 of the output of a node is included in a node's definition. Some knowledge network nodes may be designed not to return anything to the user, but instead to perform certain functions within the network.

Even though a knowledge network node has many details about itself, a subset 220 of this information can be used to uniquely identify it. There may also be several subsets of the information through which a knowledge network node can be identified uniquely in the system.

The knowledge network nodes created with the above characteristics have a life of their own. They can dictate what they do, like a process in an operating system, but within the framework of knowledge networks. In some embodiments, a knowledge network node can be kept as a Uniform Resource Locator (URL, a type of Uniform Resource Identifier or URI) that contains all the details of that node. A node comes into existence upon invocation of a function by the user, such as search, propagate, bid, sell etc. The knowledge network nodes interact with IAs to accomplish specific work. A knowledge network is created by a knowledge network server, and users do not need to create the knowledge networks themselves. The act of invoking a function in a knowledge network triggers the creation of a knowledge network node. A knowledge network maintains a list of IAs and makes use of a particular set of IAs to respond to a given metadata query. A knowledge network can also access IAs in other knowledge networks through metadata queries. RDF queries are an example of such metadata queries. Details regarding RDFs and RDF queries can be found at the website of the World-Wide Web Consortium (W3C).

In the implementation described above, the IDE is a tool for knowledge gathering and IA development. The tool is capable of maintaining a reservoir of knowledge in many forms, e.g., text, binary, databases, multimedia. Using the knowledge, IA developers can build IAs of varying functionalities and complexities. For example, IAs can be developed to solve particular user needs, such as the identification, retrieval and organization of a patient's past medical data from many diverse and otherwise incompatible databases. Note that an IA developer using the IDE can add new knowledge, develop IAs from scratch, or use existing IAs as building blocks. The IDE can be implemented as a software tool using Java, C or C++ or any other programming language. Another tool that can be used to implement the IDE is the freeware Eclipse Plug-in from Eclipse.org. The IDE may be text-based, in some examples working in many different human languages such as Chinese, French, English, Hindi, etc., or it may have a graphical user interface (GUI). The metadata vocabulary is shared between the IDE and the knowledge network, and between the knowledge network nodes and the IAs.

An IA developed using the IDE can be deployed as an individual program or as an application on an application server. In the implementation of FIG. 7A and 7B, IAs run as applications on a software layer called the knowledge network layer. This knowledge network layer is a software layer deployed on application servers that facilitates creation, maintenance, and destruction of IAs, as well as communication among IAs and their input/output. A knowledge network itself can be implemented either based on flexible metadata as described above or as a static software application.

When a knowledge network function is invoked by a user, the knowledge network server builds a knowledge network node. The newly created knowledge network node exists only as long as it takes to complete the requested function. In this example, a knowledge network node is analogous to an XML-based RDF document. It acts as the nerve center to accomplish its specified functionality using resources including IAs, the knowledge network vocabulary, and knowledge network server capabilities.

In some examples, the knowledge network server (described as a "Health Server" given the medical domain) is a combination of an off the shelf application server, the knowledge network layer (consisting of knowledge network vocabularies and IAs), and knowledge network nodes. The knowledge network layer uses an application server for load balancing, security, reliability, and availability. In addition, the IDE is well integrated into the functionalities of the knowledge network server so that they function in tandem.

An important element of a knowledge network is a system capable of describing data, i.e., metadata. Technologies such as databases, markup languages such as SGML, HTML, XML, and RDF are examples of such systems. Semantic web has been used to illustrate the concepts described above, but these concepts are not limited to semantic web. A programmer can implement a knowledge network independently of the metadata system used as long as the system is capable of some form of metadata representation. A knowledge network can be implemented in a system composed entirely of data by building a layer capable of describing the data. Such an implementation would not be dependent on markup languages or databases. For example, a data-only implementation could use a binary data-based proprietary system to implement such a data-describing layer.

Other embodiments are within the scope of the following claims.

What is claimed is:
1. A method comprising
enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which defining the conceptual nodes comprises:
 creating a first node, and
 recording an identification of the at least one piece of knowledge in the first node and a task that the first node is capable of performing.

2. The method of claim 1 in which creating the first node comprises:
 in the first node,
  collecting knowledge relevant to the task,
  establishing an RDF triplet and metadata characterizing the first node,
  providing a server node with the identification of the knowledge in the first node and the task, and
  carrying out the task.

3. A method comprising
enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, the method also comprising:
 in a node,
  releasing resources from the node,
  establishing metadata characterizing the final state of the node, and
  returning the metadata to another node.

4. A method comprising
enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which performing a task comprises:
 in a routing node,
  receiving a request that uses a vocabulary that the routing node does not understand,
  sending the request to a first node that understands the vocabulary, and
  sending any metadata needed to satisfy the request to the first node.

5. A method comprising
enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which defining relationships between the nodes comprises:
 in a routing node,
  receiving a request that uses a vocabulary that the routing node does not understand,
  receiving a translation of the request's vocabulary from a first node that understands the vocabulary,
  adding the request's vocabulary to the routing node's vocabulary, and
  sending the request and any metadata needed to satisfy the request to a node that includes a task corresponding to the request.

6. A method comprising
enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which performing a task comprises:
- in a routing node,
  - receiving a request that uses a vocabulary that the routing node understands, and
  - sending the request and any metadata needed to satisfy the request to a node that includes a task corresponding to the request.

7. A method comprising enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which performing a task comprises:
- in a switch node,
  - receiving a request that uses a vocabulary that the switch node does not understand,
  - transmitting the vocabulary to discover a first node that understands the vocabulary,
  - sending the request to the first node, and
  - sending any metadata needed to satisfy the request to the first node.

8. A method comprising enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which performing a task comprises:
- in a switch node,
  - receiving a request that uses a vocabulary that the switch node does not understand,
  - transmitting the vocabulary to discover a first node that understands the vocabulary,
  - receiving a translation of the request's vocabulary from the first node,
  - adding the request's vocabulary to the switch node's vocabulary, and
  - sending the request and any metadata needed to satisfy the request to a node that includes a task corresponding to the request.

9. A method comprising enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which performing a task comprises:
- in a switch node,
  - receiving a request that uses a vocabulary that the switch node understands, and
  - sending the request and any metadata needed to satisfy the request to a first node that includes a task corresponding to the request.

10. A method comprising enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which defining the conceptual nodes includes:
in a first node
changing one or more of the pieces of knowledge and one or more of the tasks identified by the first node, and
communicating the change to a second node.

11. A method comprising
enabling a job to be done using pieces of knowledge that relate to a domain of human activity and that are stored in respective places each under the control of a system that can perform one or more defined tasks with respect to the piece stored there, the enabling comprising
defining conceptual nodes, each node identifying at least one of the pieces of knowledge and at least one of the tasks that can be performed using the piece of knowledge, the pieces and the tasks being defined using subsets of a common vocabulary associated with the domain of human activity, and
expressing the job to be done in the common vocabulary and without specifying the location of the pieces of knowledge needed to perform the job or the tasks to be performed to complete the job, and
enabling the job to be done by causing one or more of the conceptual nodes to perform one or more of the tasks on one or more of the pieces of information, without requiring storage of copies of the pieces of knowledge anywhere other than the places that are under control of the systems system, and
the method further comprising:
retrieving first information from a subset of the conceptual nodes,
from the first information, identifying a second subset of the conceptual nodes,
retrieving second information from the second subset, and
providing the second information to an output process.

12. A method comprising
enabling a job to be done using pieces of knowledge that relate to a domain of human activity and that are stored in respective places each under the control of a system that can perform one or more defined tasks with respect to the piece stored there, the enabling comprising
defining conceptual nodes, each node identifying at least one of the pieces of knowledge and at least one of the tasks that can be performed using the piece of knowledge, the pieces and the tasks being defined using subsets of a common vocabulary associated with the domain of human activity, and
expressing the job to be done in the common vocabulary and without specifying the location of the pieces of knowledge needed to perform the job or the tasks to be performed to complete the job, and
enabling the job to be done by causing one or more of the conceptual nodes to perform one or more of the tasks on one or more of the pieces of information, without requiring storage of copies of the pieces of knowledge anywhere other than the places that are under control of the systems system, and
in which the subset of the common vocabulary describing the pieces of knowledge for a conceptual node comprises a pool of metadata nouns and verbs describing information.

13. A method comprising
enabling a job to be done using pieces of knowledge that relate to a domain of human activity and that are stored in respective places each under the control of a system that can perform one or more defined tasks with respect to the piece stored there, the enabling comprising
defining conceptual nodes, each node identifying at least one of the pieces of knowledge and at least one of the tasks that can be performed using the piece of knowledge, the pieces and the tasks being defined using subsets of a common vocabulary associated with the domain of human activity, and
expressing the job to be done in the common vocabulary and without specifying the location of the pieces of knowledge needed to perform the job or the tasks to be performed to complete the job, and
enabling the job to be done by causing one or more of the conceptual nodes to perform one or more of the tasks on one or more of the pieces of information, without requiring storage of copies of the pieces of knowledge anywhere other than the places that are under control of the systems system, and
in which the subset of the common vocabulary describing the tasks for a conceptual node comprises a pool of metadata verbs describing actions that the node can perform itself.

14. A method comprising
enabling a job to be done using pieces of knowledge that relate to a domain of human activity and that are stored in respective places each under the control of a system that can perform one or more defined tasks with respect to the piece stored there, the enabling comprising
defining conceptual nodes, each node identifying at least one of the pieces of knowledge and at least one of the tasks that can be performed using the piece of knowledge, the pieces and the tasks being defined using subsets of a common vocabulary associated with the domain of human activity, and
expressing the job to be done in the common vocabulary and without specifying the location of the pieces of knowledge needed to perform the job or the tasks to be performed to complete the job, and
enabling the job to be done by causing one or more of the conceptual nodes to perform one or more of the tasks on one or more of the pieces of information, without requiring storage of copies of the pieces of knowledge anywhere other than the places that are under control of the systems system, and
in which the subset of the common vocabulary describing the tasks for a conceptual node comprises a pool of metadata verbs describing actions that the conceptual node can perform for other conceptual nodes in the set.

15. A method comprising
enabling a job to be done using pieces of knowledge that relate to a domain of human activity and that are stored in respective places each under the control of a system that can perform one or more defined tasks with respect to the piece stored there, the enabling comprising
defining conceptual nodes, each node identifying at least one of the pieces of knowledge and at least one of the tasks that can be performed using the piece of knowledge, the pieces and the tasks being defined using subsets of a common vocabulary associated with the domain of human activity, and
expressing the job to be done in the common vocabulary and without specifying the location of the pieces of knowledge needed to perform the job or the tasks to be performed to complete the job, and
enabling the job to be done by causing one or more of the conceptual nodes to perform one or more of the tasks on one or more of the pieces of information, without requiring storage of copies of the pieces of knowledge anywhere other than the places that are under control of the systems system, and in which the piece of information for a first node comprises an identification of second nodes with which the first node can exchange data.

16. A method comprising enabling a job to be done using pieces of knowledge that relate to a domain of human activity and that are stored in respective places each under the control of a system that can perform one or more defined tasks with respect to the piece stored there, the enabling comprising defining conceptual nodes, each node identifying at least one of the pieces of knowledge and at least one of the tasks that can be performed using the piece of knowledge, the pieces and the tasks being defined using subsets of a common vocabulary associated with the domain of human activity, and expressing the job to be done in the common vocabulary and without specifying the location of the pieces of knowledge needed to perform the job or the tasks to be performed to complete the job, and enabling the job to be done by causing one or more of the conceptual nodes to perform one or more of the tasks on one or more of the pieces of information, without requiring storage of copies of the pieces of knowledge anywhere other than the places that are under control of the systems system, and in which the pieces of knowledge and tasks identified by a node also describe output of the node.

\* \* \* \* \*